US007374602B2

(12) United States Patent
McNulty

(10) Patent No.: US 7,374,602 B2
(45) Date of Patent: *May 20, 2008

(54) SYSTEM AND METHOD OF WATER TREATMENT

(75) Inventor: Peter McNulty, Los Angeles, CA (US)

(73) Assignee: NEI Treatment Systems, LLC, Los Angeles, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/033,359

(22) Filed: Jan. 10, 2005

(65) Prior Publication Data
US 2005/0252376 A1   Nov. 17, 2005

Related U.S. Application Data

(63) Continuation-in-part of application No. 10/164,344, filed on Jun. 7, 2002, now Pat. No. 6,840,983, which is a continuation-in-part of application No. 10/136,627, filed on May 2, 2002, now abandoned.

(51) Int. Cl.
*B01D 19/00* (2006.01)
(52) U.S. Cl. .................... 95/245; 95/265; 96/202; 422/7; 261/76; 261/DIG. 75; 114/125
(58) Field of Classification Search ............... 95/245, 95/263, 264, 265, 246; 96/202; 422/7; 261/76, 261/DIG. 75; 43/124; 114/125
See application file for complete search history.

(56) References Cited

U.S. PATENT DOCUMENTS 3,676,983 A * 7/1972 Nold .................. 96/196

4,246,111 A * 1/1981 Savard et al. ............ 210/96.1
4,259,360 A * 3/1981 Venetucci et al. ........ 426/231

(Continued)

FOREIGN PATENT DOCUMENTS

EP         0323646 A      7/1989

(Continued)

OTHER PUBLICATIONS

Hoggan, J. et al., "A Simple Production System for the Deoxigenation of Water," European Brewery Convention, Berlin, DE 1979, p. 245, XP000123224.

(Continued)

*Primary Examiner*—Duane Smith
*Assistant Examiner*—Douglas J. Theisen
(74) *Attorney, Agent, or Firm*—Tope-McKay & Associates

(57) ABSTRACT

The present invention generally offers a system and a method that allows a vessel to treat water while providing corrosion inhibition. An oxygen stripping gas source produces oxygen stripping gas that may be pumped directly to, preferably but optionally, a venturi injector, or may first be pumped into an empty tank and then delivered to the injector means. Water being pumped through the injector via a transfer piping means comes into contact with the oxygen stripping gas, and dissolved oxygen in the water transfers to micro-fine stripping gas bubbles generated by the injector. The water and the micro-fine bubbles are pumped from the injector and into the tank, where the micro-fine bubbles float to the surface, and the oxygen is released into the tank's headspace. The deoxygenated water may be re-circulated through the system for additional deoxygenation or released from the tank into the surrounding waterways.

4 Claims, 5 Drawing Sheets

U.S. PATENT DOCUMENTS

| | | | |
|---|---|---|---|
| 4,472,283 A | | 9/1984 | Brooks |
| 4,612,021 A | * | 9/1986 | Bland et al. .................. 95/265 |
| 4,931,225 A | * | 6/1990 | Cheng .......................... 261/76 |
| 5,015,395 A | | 5/1991 | Muia et al. |
| 5,062,967 A | | 11/1991 | Muia et al. |
| 5,096,601 A | | 3/1992 | Muia et al. |
| 5,128,050 A | | 7/1992 | Gill |
| 5,192,451 A | * | 3/1993 | Gill ........................... 210/755 |
| 5,252,330 A | | 10/1993 | Lee et al. |
| 5,376,282 A | * | 12/1994 | Chang ......................... 210/750 |
| 5,578,116 A | * | 11/1996 | Chang ......................... 96/194 |
| 5,863,128 A | * | 1/1999 | Mazzei ..................... 366/163.2 |
| 6,125,778 A | * | 10/2000 | Rodden ..................... 114/74 R |
| 6,126,842 A | * | 10/2000 | Decker ....................... 210/760 |
| 6,171,508 B1 | * | 1/2001 | Browning, Jr. ............. 210/750 |
| 6,193,893 B1 | * | 2/2001 | Mazzei et al. ............. 210/702 |
| 6,274,052 B1 | * | 8/2001 | Hartwig ...................... 210/760 |
| 6,516,738 B2 | | 2/2003 | Cannon |
| 6,761,123 B2 | | 7/2004 | Husain et al. |
| 6,773,607 B2 | | 8/2004 | Russell |
| 6,869,540 B2 | | 3/2005 | Robinson et al. |

FOREIGN PATENT DOCUMENTS

WO      WO 01/36339 A1 * 5/2001

OTHER PUBLICATIONS

M. N. Tamburri, et al., "Ballast water deoxygenation can prevent aquatic introductions while reducing ship corrosion" Biological Conservation 103 (2002) 331-341.

R. F. McMahon, et al., "Effects of elevated carbon dioxide concentrations on survivorship in Zebra Mussels (*Dreissena polymorpha*) and Asian Clams (*Corbicula fluminea*)" Center for Biological Macro fouling Research, Box 19498, The University of Texas at Arlington, 1995.

* cited by examiner

SYSTEM AND METHOD OF WATER TREATMENT

PRIORITY CLAIM

The present application is a Continuation-in-Part application, claiming the benefit of priority of U.S. patent application Ser. No. 10/164,344, now U.S. Pat. No. 6,840,983, filed Jun. 7, 2002, entitled, "System and Method of Water Treatment", which was a Continuation-in-Part application of U.S. patent application Ser. No. 10/136,627, filed May 02, 2002, entitled, "System and Method of Water Treatment," which is now abandoned.

BACKGROUND OF THE INVENTION

1. Field of the Invention

A system and method of water treatment using a venturi injector facilitates the removal of dissolved oxygen from water thereby reducing the population of undesirable aquatic organisms present in the water while inhibiting corrosion. The system and method of water treatment has particular utility for use in connection with a vessel by allowing the vessel to treat ballast water that is being transported from one port area to another, thereby limiting environmentally adverse effects, while inhibiting corrosion. The system and method of water treatment may have other uses, such as in oil production.

For instance, before a ship leaves a port empty, or partially loaded, it takes on water into ballast tanks to maintain stability and adjust buoyancy. In virtually every case, this ballast water will contain living organisms which are affected by levels of dissolved oxygen in the water. When the ship reaches its destination and prepares to load its cargo, it discharges this ballast water, thus introducing potentially invasive species to the aquatic environment of the destination port. Approximately 40,000 major cargo vessels carry billions of tons of ballast water around the world annually and are thus believed to be responsible for the introduction of hundreds of marine invasive species to non-native environments. The total cost of these invasions is indeterminate, but several estimates put it in the billions of dollars.

To address this issue, many national governments and state governments in the United States have passed regulations governing vessel ballast water management. The International Maritime Organization has proposed draft guidelines recommending treatment of ballast water. The United States Coast Guard is presently developing guidelines for potential future ballast water treatment requirements for vessels trading into ports in the United States.

The vast majority of the world's fleet of ships, including naval as well as commercial vessels are constructed of steel. Steel corrodes when exposed to oxygen and water. Corroded steel structures on a vessel decrease seaworthiness, and extensive measures are taken to avoid it, and to repair it. Estimates of the cost to protect against and repair corrosion on vessels runs into the billions of dollars annually worldwide.

One area in a ship where corrosion is of particular concern is in the ballast water tanks. For example, the largest oil tankers may have up to 15,000,000 gallons (57,000 tons) of ballast water capacity. Prolonged exposure of the ballast tank structure to water (often salt water) creates a condition conducive to rapid corrosion. At the time of this writing, the cost to paint ballast tanks is typically $5.00 to $10.00 per square foot while other estimates suggest that the cost to repair corroded areas are approximately $500 per square foot.

Thus, systems that treat water in order to eliminate aquatic organisms while providing corrosion inhibition in a time and cost-efficient manner are desirable. One form of eliminating aquatic organisms in ballast water is through the deoxygenation of the water as the water is taken from the surrounding waterways. The concentration of a solute gas in solution is directly proportional to the partial pressure of the gas above the solution. (This physical phenomenon is governed by Henry's Law, and the dissolved concentration can be calculated using the Henry's Law constant for that solute.) As such, when exposed to a stripping gas (such as nitrogen or other low-oxygen gas mixture), oxygen readily diffuses out of water, which contains between 6 to 10 parts per million (0.001 percent) of dissolved oxygen, in an effort to return to the mixture found in air, which is approximately 79 percent nitrogen and 21 percent oxygen. The use of nitrogen gas to remove the dissolved oxygen present in ballast water has been documented as offering an efficient and economically desirable means of treating ballast water while also providing corrosion inhibition effects. See MARIO N. TAMBURRI et al.: Ballast water deoxygenation can prevent aquatic introductions while reducing ship corrosion. *Biolog. Conserv.* (2002) 103: 331-341. The Henry's Law constants for a variety of potential stripping gases and mixtures thereof show that a variety of gases can be used to deoxygenate water.

Aboard a vessel, an efficient way to expose the dissolved oxygen in water to a stripping is to create micro-fine bubbles of gas in the water. Micro-fine stripping gas bubbles created in water have the capability of transferring dissolved oxygen from the water as the micro-fine bubbles float from the bottom to the top of a tank. A commonly recognized efficient, safe, and reliable way to create micro-fine bubbles is through the use of a venturi injector.

2. Description of the Prior Art

Water treatment, and more particularly, ballast water treatment, apparatuses and methods are desirable for allowing vessels to treat water that is being transported from one port area to another. Such treatment limits the environmentally hazardous effects that may result when the water is later released into an environment that is ecologically different from that in which the water was originally obtained.

The use of water treatment apparatuses and methods are known in the prior art. For example, U.S. Pat. No. 6,171,508 to Browning discloses a method and apparatus for killing microorganisms in ship ballast water. However, the Browning '508 patent does not use stripping gas to deoxygenate the ballast water and consequently fails to disclose any corrosion inhibition properties, and has further drawbacks of using a less efficient vacuum mechanism to remove the dissolved oxygen from the ballast water.

U.S. Pat. No. 6,125,778 to Rodden discloses ballast water treatment that treats ballast water using ozone. However, the Rodden '778 patent does not provide for corrosion, and fails to use the more efficient venturi-injector facilitated means of to treat the ballast water.

Similarly, U.S. Pat. No. 5,192,451 to Gill discloses a method for controlling zebra mussels in ship ballast tanks that treats ballast water with a water-soluble dialkyl diallyl quaternary ammonium polymer. However, the Gill '451 patent does not allow for water treatment without the occurrence of a chemical reaction, and does not provide for any corrosion inhibition properties.

Additionally, U.S. Pat. Nos. 5,376,282 and 5,578,116 to Chang both disclose the use of a vacuum and agitation to remove dissolved oxygen from water in order to inhibit the survival of zebra mussels. However, neither the '282 nor the '116 patent provides for a more efficient venturi injector-facilitated delivery of stripping gas to deoxygenate the ballast water and have the further disadvantages of failing to provide for corrosion inhibition effects during the removal of dissolved oxygen from the water.

U.S. Pat. No. 6,126,842 to Decker discloses a method of low-concentration ozone wastewater treatment that injects a gas mixture of a low-concentration of ozone gas in oxygen into a wastewater stream while mixing to provide a reduction in the wastewater pollutants. However, the Decker '842 patent, although providing an efficient ozone-based treatment system using a venturi injector, does not disclose the treatment of ballast water on a vessel nor does the '842 patent offer the even greater advantages obtained using an oxygen stripping gas such as increased efficiency and corrosion inhibition.

U.S. Pat. No. 6,274,052 to Hartwig discloses the ozonation of pool water that uses a series of venturi injectors for ozone delivery. However, the Hartwig '052 patent does not disclose the injection of an oxygen stripping gas into the water through venturi injectors in order to deoxygenate the water, and has the additional deficiency of failing to provide for any corrosion inhibition effects during the process described.

U.S. Pat. No. 4,246,111 to Savard discloses an apparatus is provided for treating wastewater biologically and clarifying the biologically treated water. However, the Savard '111 patent does not use an oxygen stripping gas for the deoxygenation of water, preferably but optionally ballast water, further fails to provide for corrosion inhibition.

Lastly, U.S. Pat. No. 3,676,983, to Nold discloses an apparatus and method for degassing a liquid using a vacuum chamber and agitation. However, the Nold '983 patent requires cavitation of the liquid and does not use a venturi injector to more efficiently enhance the degassing of the liquid.

While the above-described inventions fulfill their particular objectives and requirements, the aforementioned patents do not describe a system and method for water treatment which allows a vessel to treat ballast water that is being transported from one port area to another while providing corrosion inhibition.

The aforementioned patents and other water treatment systems and methods currently known in the art make no provisions for the treatment of water using an injector means to facilitate stripping gas deoygenation while also providing corrosion inhibition.

SUMMARY OF THE INVENTION

In view of the foregoing disadvantages inherent in the known types of water treatment systems and methods now present in the prior art, the present invention provides an improved system and method to treat water using an oxygen stripping gas that is injected though an injector means, preferably but optionally a venturi injector, to facilitate deoxygenation of the water and overcomes the disadvantages and drawbacks noted in the prior art. As such, the general purpose of the present invention, which will be described subsequently in greater detail, is to provide a new and improved system and method for water treatment which has all the advantages of the prior art mentioned heretofore and many novel features that result in a system and method for water treatment which is not anticipated, rendered obvious, suggested, or even implied by the prior art, either alone or in any combination thereof.

To attain this, the present invention comprises a system for water treatment having a receptacle and an injector means, which is optionally but preferably a venturi injector, that has an inlet port that is adapted to receive water, an injector port that is adapted to receive oxygen stripping gas, and an outlet port that is adapted to expel water. Water enters the inlet port and passes through the injector wherein the water contacts the stripping gas being received through the injector port of the injector means. Water is then expelled from the outlet port to the receptacle. The stripping gas being received by the injector means is from a gas generation source. The gas may be delivered to the injector means by a first gas delivery means that connects the gas source to the receptacle, which may preferably but optionally be a ballast tank, and a second gas delivery means that connects the receptacle to the injector port of the injector means. As an alternative, the receptacle may optionally be a water conduit where the water passes directly form the injector means to a surrounding waterway. In combination with the first and second gas delivery means, or in the alternative, there may be a third gas delivery means that connects the gas source to the injector port of said injector means and thus delivers the stripping gas directly from the source to the injector port. Preferably but optionally, the injector means is connected in series to a transfer piping means such that the inlet port receives said water passing through the transfer piping means and the outlet port expels the water back into the transfer piping means which may be connected to the receptacle. Additionally, a booster blower and/or a regulator, which is optionally but preferably a demand valve, may be attached in series with the second stripping gas delivery means between the receptacle and the injector means in order to control the flow of stripping gas into the injector means. A pump means, preferably but optionally a ballast pump as found on many vessels, is adapted to receive water from an external water source and may pump water through the injector means.

The system may also include a re-circulation means that takes water in the receptacle and re-circulates the water from the receptacle via a re-circulation piping means and re-pumps the water through the injector means back into the receptacle. This re-circulation means, optionally but preferably, is monitored by sensors which may be activated by a control panel means, where the sensors are preferably but optionally gaseous oxygen and dissolved oxygen sensors that monitor the level of oxygen present in the treated water. The invention may also have a re-oxygenating means and step that occurs prior to the release of the deoxygenated water. This re-oxygenation serves to reduce negative environmental effects that may occur when releasing large amounts of deoxygenated water into surrounding waterways. There are, of course, additional features of the invention that will be described hereinafter and which will form the subject matter of the claims attached.

Numerous objects and advantages of the present invention will be readily apparent to those of ordinary skill in the art upon a reading of the following detailed description of presently preferred, but nonetheless illustrative, embodiments of the present invention when taken in conjunction with the accompanying drawings. It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system and method for water treatment that has the advantages of the prior art water treatment apparatuses and methods plus additional advantages and benefits.

Still another object of the present invention is to provide a new system and method of water treatment that provides in the systems and methods of the prior art some of the advantages thereof, while simultaneously overcoming some of the disadvantages normally associated therewith.

Still yet another object of the present invention is a system that provides for the use of oxygen stripping gas and thus offers more efficient stripping gas delivery than other traditional sparging or bubble diffusion gas delivery methods. This allows for an economically favorable and efficient manner by which to limit the environmentally adverse effects that may result when the untreated water is released into an environment that is ecologically different from that in which the water was originally obtained.

Even still another object of the present invention is to provide a system and method of water treatment for allowing a vessel to treat water with oxygen stripping gas that is injected into a stream of the water, preferably but optionally, by a venturi injector. This makes it possible to efficiently treat water, preferably but optionally ballast water, while providing corrosion inhibition, thereby decreasing the overall maintenance and costs associated with the water treatment.

Additionally, the present invention also provides for a system and method for water treatment using stripping gas-facilitated deoxygenation in which oxygen is stripped from the water. This oxygen-stripping system and method allows for the treatment of the water with increased efficiency and without the use of chemicals.

It is a further object of the present invention to provide a new and improved method for deoxygenating water, preferably but not limited to the purposes of inhibiting the survival of aquatic organisms and/or corrosion inhibition. The method comprises utilizing an injector means, preferably but optionally a venturi injector, having an inlet port that is adapted to receive water, an injector port that is adapted to receive the stripping gas, and an outlet port that is adapted to expel the water where water to be treated is supplied to the inlet port and stripping gas is supplied to the injector port, thereby inducing within the water a myriad of micro-fine bubbles wherein oxygen in the water diffuses from an aqueous phase to a gaseous phase within said micro-fine bubbles. The method further involves expelling the water and the micro-fine bubbles from the outlet port of the injector means to a receptacle, which is preferably but optionally a ballast tank, wherein the micro-fine bubbles are released from the water and the oxygen is thereby diffused from the water. The method for deoxygenating water may further comprise re-circulating said water through the injector means to provide further deoxygenation, and may also include re-oxygenating the water before releasing the water to the surrounding waterways from the receptacle, which is preferably but optionally a ballast tank, or alternatively, but not exclusively, a closed tank or a water conduit connecting to surrounding waterways.

It is another object of the present invention to provide a new and improved system and method for water treatment that may be easily and efficiently manufactured and marketed.

Lastly, it is an object of the present invention is to provide a new and improved system and method for water treatment that has a relatively low cost of manufacture with regard to both materials and labor, and which accordingly is then capable of relatively low prices of sale to the consuming public and industries.

There thus has been outlined broadly the more important features of the invention in order that the detailed description thereof that follows may be better understood and in order that the present contribution to the art may be better appreciated.

The objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
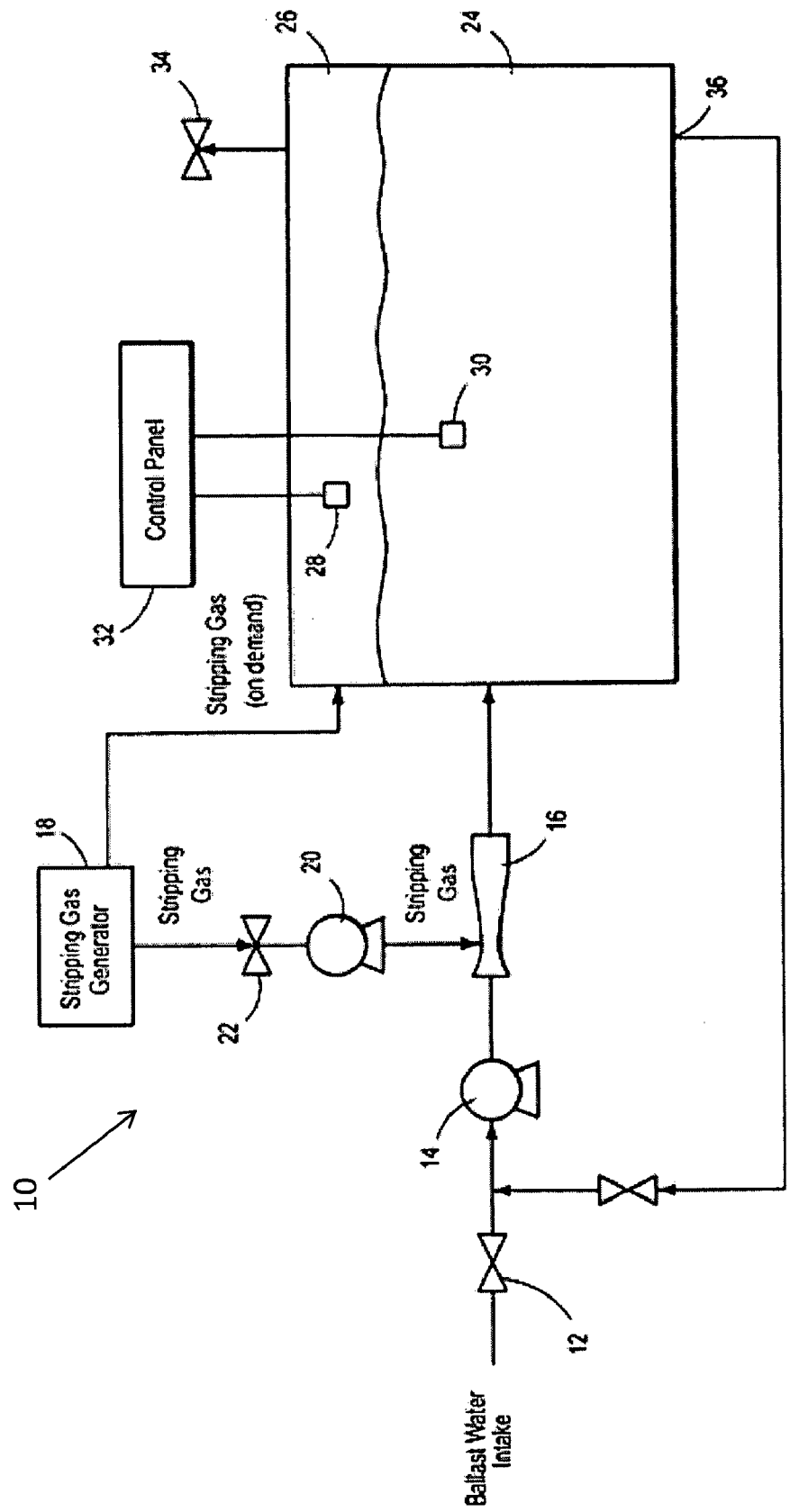
FIG. 1 is a process flow diagram of the current embodiment of the system and method of water treatment constructed in accordance with the principles of the present invention.

Referring now to the drawings, and particularly to FIGS. 1-5, a current embodiment of the system and method of water treatment of the present invention is shown and generally designated by the reference numeral 10.

In FIG. 1, basic flow diagram of a new and improved system for water treatment using stripping gas deoxygenation 10, which allows a vessel to treat water that is being transported from one port area to another while providing for corrosion inhibition is illustrated and will be described.

More particularly, the system for water treatment using stripping gas deoxygenation 10 has a water intake means 12 though which water enters from outside a vessel. The water is then pumped through a pump means, such as, but not limited to, a ballast pump 14, into an inlet port on an injector means 16, such as a venturi injector. Oxygen stripping gas that is obtained from a stripping gas source 18 is delivered to the inlet port of the injector means 16 which is facilitated by a booster blower 20, and may be further controlled by a regulator 22, which is preferably but optionally a demand valve. Additionally, stripping gas may be pumped from the stripping gas source 18 into a receptacle 24, which is preferably but optionally a vessel's ballast tank. The stripping gas being delivered to the injector means 16 contacts the water within the injector means 16, and the mixture of the oxygen stripping gas and water is pumped from the injector means 16 to the receptacle 24, or a vessel's ballast tank. Once the mixture is inside the receptacle 24, dissolved oxygen from the water and the stripping gas that have combined within micro-fine bubbles generated by the injector means 16, float to the headspace 26 of the receptacle 24. A series of sensors, which are preferably but optionally gaseous oxygen sensors 28, dissolved oxygen sensors 30, may be present in the receptacle 24 to monitor the amount of dissolved oxygen remaining in the water. There may also be a control panel means 32 present to provide for further regulation and control of the sensors and the system as a whole. A pressure valve and/or series of pressure valves 34, typically positioned on the top portion of the receptacle 24, passively release gas in order to regulate the pressure within the receptacle. If necessary, a portion of the water in the receptacle 24 may be re-circulated to a re-circulation intake point 36 and re-pumped through the ballast pump 14, the injector means 16, and back into the receptacle 24 as preferably but optionally determined by and/or controlled by the series of sensors which may in turn be controlled by the control panel means 32.

Figure 2:
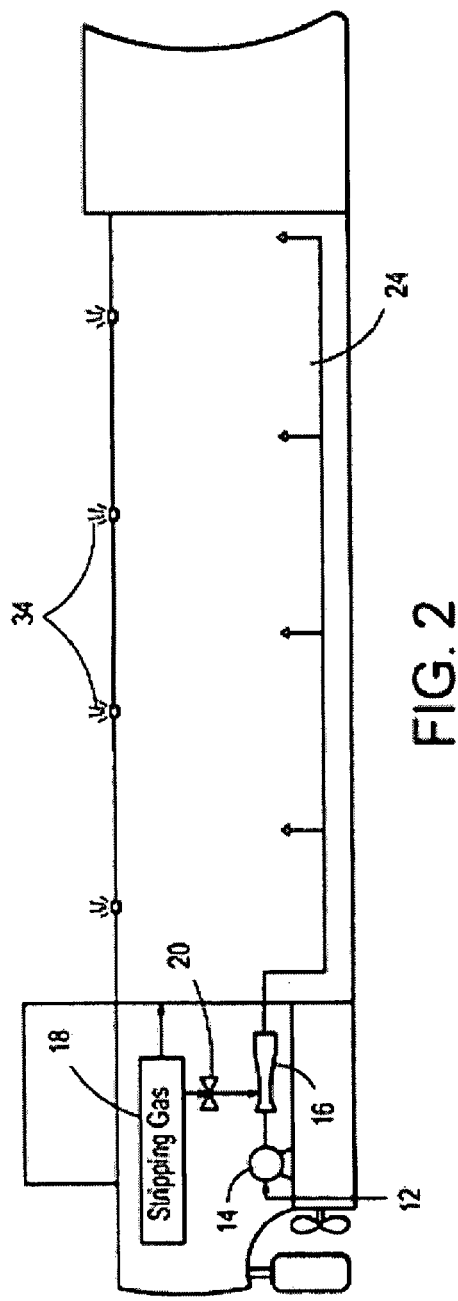
FIG. 2 is a front elevational view of the system and method of water treatment of the present invention as situated in a vessel.

FIG. 2 depicts the system for water treatment, as the invention would be situated in a vessel, ship or other seafaring liner. As shown, water, preferably but optionally ballast water, is brought onboard the vessel by a water intake means 12, which generally is located at the vessel's stern. The water is then pumped through a pump means, such as a ballast pump 14, into an injector means 16, such as a venturi injector. Oxygen stripping gas that is being obtained from a stripping gas source 18, may then be pumped through a booster blower 20 and into the injector means 16. The booster blower 20 may also serve to control the amount of stripping gas introduced into the water so as to keep up with the displacement of stripping gas by the water in the vessel's receptacle 24. Stripping gas is also pumped from the stripping gas source 18 into the receptacle 24 or ballast tank in order to provide further corrosion inhibition in the empty receptacle 24. The stripping gas being delivered to the injector means 16 contacts the water within the injector means 16, and the mixture of the two is pumped from the injector means 16 to the vessel's receptacle 24, which is optionally but preferably a ballast tank. Once inside the receptacle 24, the dissolved oxygen from the water and the stripping gas that have combined within micro-fine bubbles generated by the injector means 16, float to the headspace, or other area above the water, in the receptacle 24. A series of pressure valves 34, preferably but optionally, positioned on the top of the receptacle 24, and extending through to the vessel's deck, control the level of the pressure inside the receptacle 24 at any given time.

Figure 3:
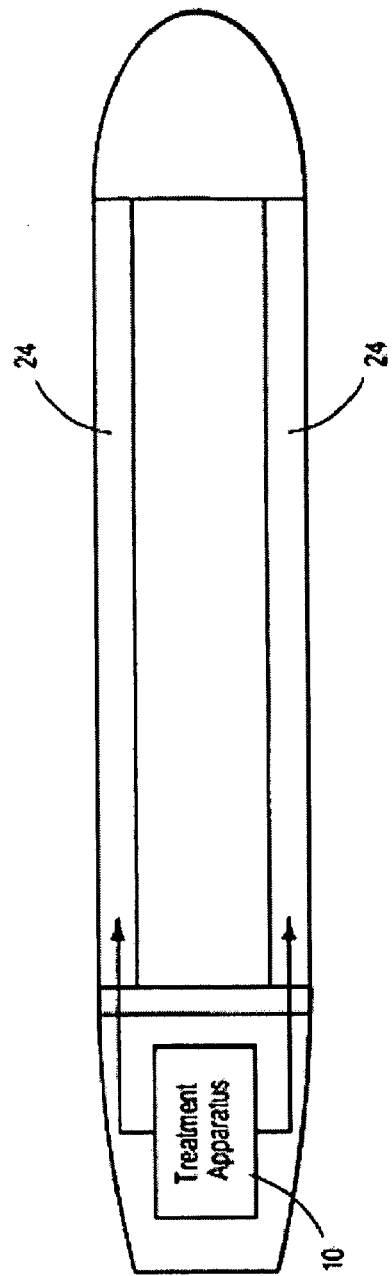
FIG. 3 is a top plan view of the vessel with the present invention system and method of water treatment included therein.

FIG. 3, shows the vessel from above so as to depict the location of the system for water treatment when in a vessel. As shown, the system for water treatment 10 will be situated, preferably but optionally, at or near the stern of the vessel and pump the water to receptacles, that are preferably ballast tanks 24 located in the vessel.

Figure 4:
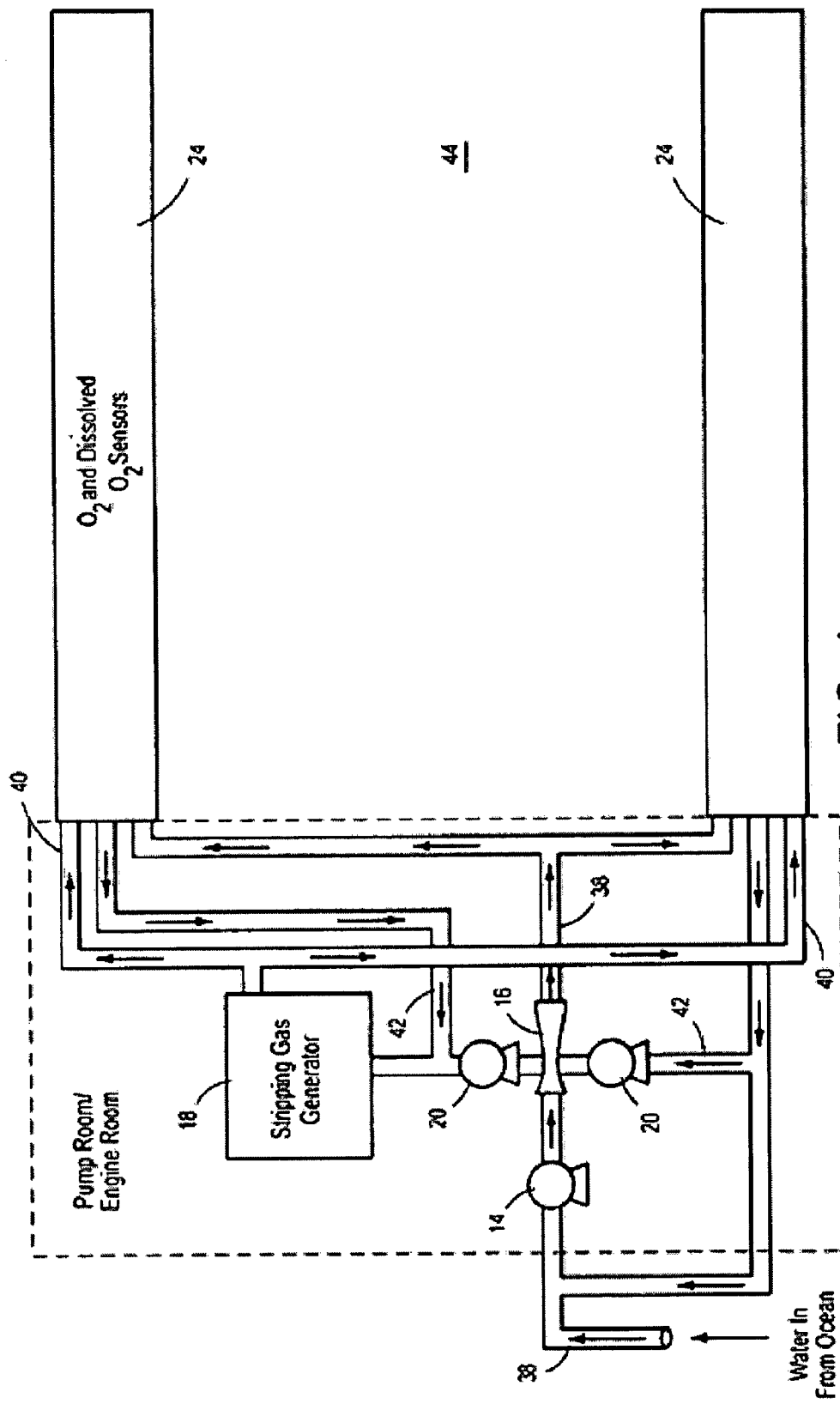
FIG. 4 is a front elevational view of the system and method of water treatment of the present invention.

In FIG. 4 the invention is shown such that water from surrounding waterways enters a vessel through transfer piping means 38. The water is then pumped through a pump means, such as a ballast pump 14, into an inlet port on an injector means 16, optionally but preferably a venturi injector which is connected in series with the transfer piping means 38, which may, preferably but optionally, incorporate a network of jet nozzles for delivery to the receptacle. Oxygen stripping gas, preferably but optionally comprised of at least 90% nitrogen, that is obtained from a gas source 18, is delivered via a first stripping gas delivery means 40 to the empty receptacle 24 which is preferably but optionally a ballast tank. This stripping gas is then delivered to the inlet port of the injector means 16 from the receptacle 24 by a second stripping gas delivery means 42. The delivery of the stripping gas to the injector means 16 may be facilitated by a booster blower 20 which may also function to increase the amount of stripping gas introduced to the water in order to accommodate the displacement of stripping gas by the water within the receptacle 24, which may be, but is not limited to, a ballast tank, a body of water, or a water conduit. The stripping gas being delivered to the injector means 16 contacts the water within the injector means 16, and the mixture of the stripping gas and water is pumped from the injector means 16 through the transfer piping means 38 to the receptacle 24. The space between the receptacle(s) 24 represents what is preferably but not limited to the cargo hold area 44 that is commonly configured as such on vessels. A series of sensors, preferably gaseous oxygen sensors 28 and dissolved oxygen sensors 30, may be present in the receptacle(s) 24 to monitor the amount of dissolved oxygen released and remaining in the water, and optionally, a control panel means may also be present to activate and control the system.

Figure 5:
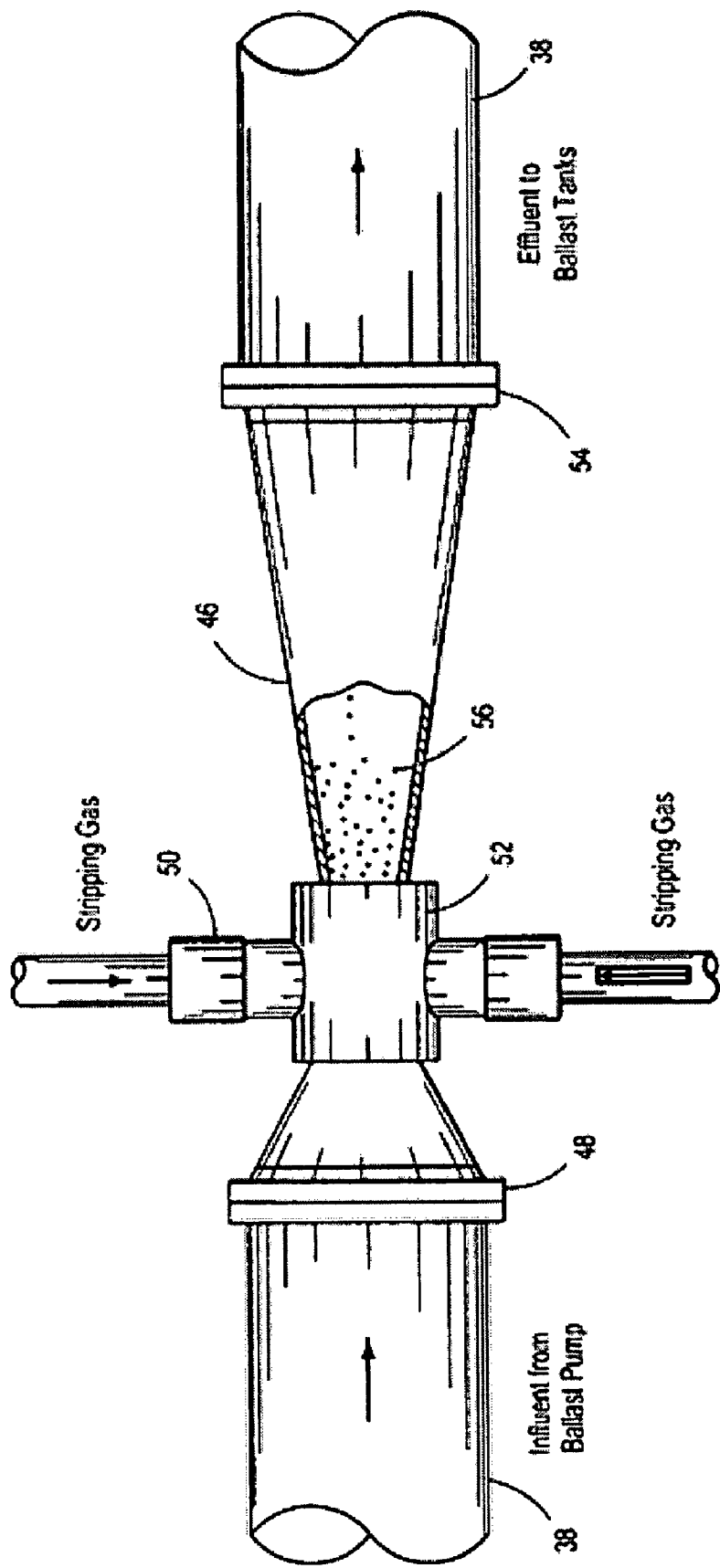
FIG. 5 is a front elevational view of the venturi injector component of the system and method of water treatment of the present invention.

In FIG. 5, a venturi injector 46 attached in series with the transfer piping means 38 is displayed. In this instance, the venturi injector is a Model 12050-SS Mazzei injector, manufactured by Mazzei Injector Corporation in Bakersfield, California. The structure and operation of this Mazzei injector is illustrated and described in U.S. Pat. No. 5,863,128, which issued on Jan. 26, 1999, to Angelo L. Mazzei, the disclosure of which is hereby incorporated by reference to the same extent as if fully set forth herein. The water from the pump means enters the inlet port 48 of the venturi injector 46. Oxygen stripping gas is delivered to the venturi injector 46 through the injector port 50 and the water and stripping gas contact in the constricting portion 52 of the venturi injector 46. The water and stripping gas are then pumped from the constricting portion 52, and the dissolved oxygen once present in the water and the stripping gas are now passed through the outlet port 54 of venturi injector 46 in micro-fine bubbles 56 generated by the pumping of the stripping gas and water through the venturi injector 46. The micro-fine bubbles 56 and the now partially deoxygenated water travel from the outlet port 54 to the transfer piping means 38 which eventually carries the deoxygenated water and the micro-fine bubbles to a receptacle wherein the additional deoxygenation may occur.

Figure 6:
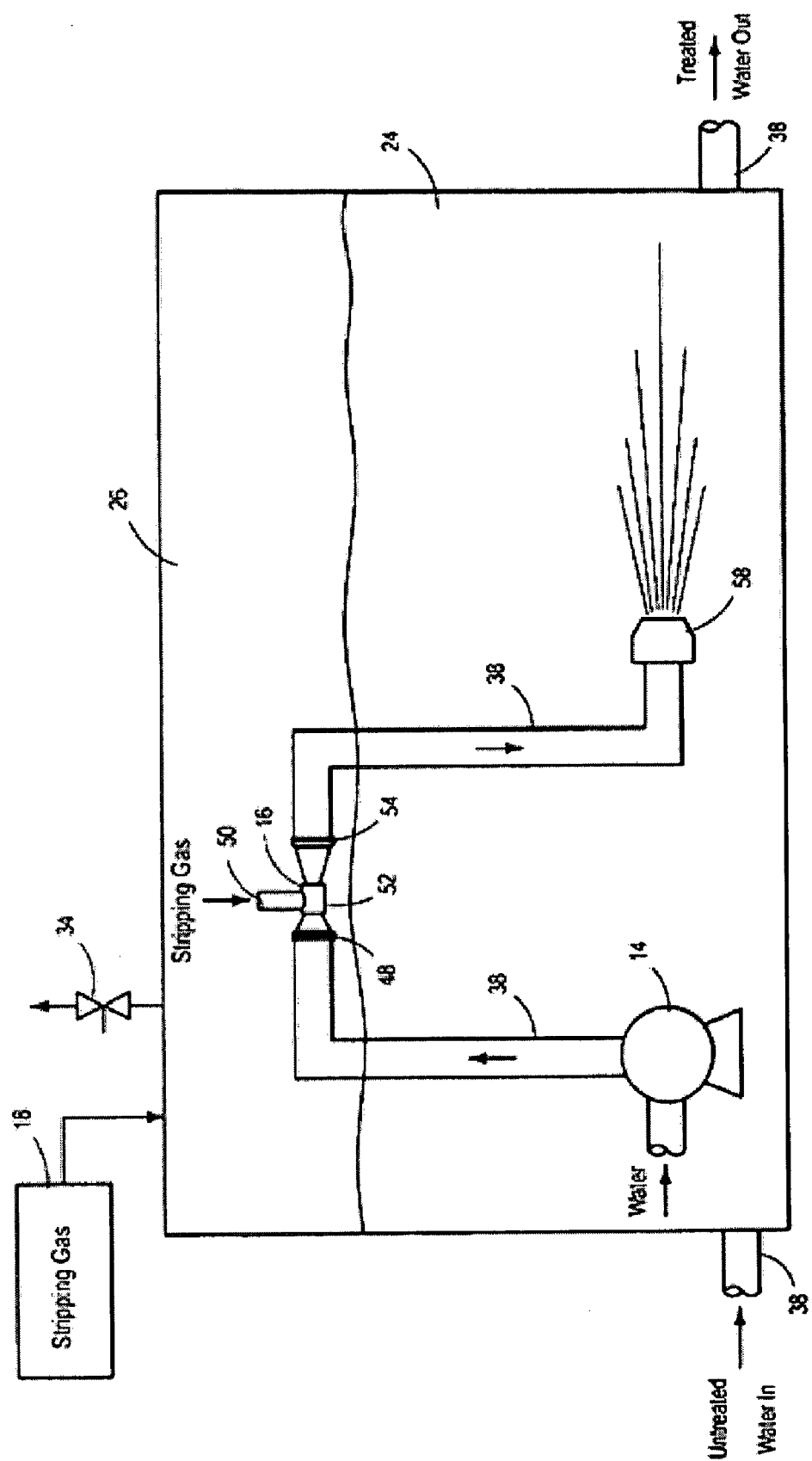
FIG. 6 is a front elevational view of a closed re-circulation system of the invention as present in a receptacle.

FIG. 6 shows a closed re-circulation system in a receptacle. Untreated water enters a receptacle 24, which is optionally but preferably a sealable tank, through a transfer piping means 38. Once inside the receptacle 24, a pump means 14 is present to pump the water through additional transfer piping 38. The water then enters an inlet port 48 of an injector means 16, which is optionally but preferably, a venturi injector. Within a constricting portion 52 of the injector means 16, the water contacts oxygen stripping gas that is being received by the injector port 50 of the injector means 16. A stripping gas source 18, that is optionally but preferably located outside of and adjacent to the receptacle 24, generates the stripping gas that is delivered by a gas delivery means to the injector port 50. A majority of the dissolved oxygen present in the water and the stripping gas are then passed from the constricting portion 52 through outlet port 54 of the injector means 16 in micro-fine bubbles generated by the pumping of the stripping gas and water through the injector means 16. Transfer piping 38 connected to the outlet port 54 transfers the micro-fine bubbles and the now partially deoxygenated water from the injector means through a jet nozzle 58 and into the receptacle 24, wherein the micro-fine bubbles travel to the headspace 26 within the receptacle, thereby releasing the oxygen from the water. A pressure valve 34, or series of pressure valves, may be present on the top portion of the receptacle 24 in order to prevent pressure build-up within the receptacle 24. The water within the receptacle 24 may be continually re-circulated, and a series of sensors and/or control panel means may be present to monitor the levels of dissolved oxygen and stripping gas so as to determine the rate of re-circulation and/or the rate by which the treated water is expelled from the receptacle 24, optionally but preferably, through additional transfer piping.

The water treatment herein described preferably though not exclusively occurs such that as the vessel pumps water on the vessel through an injector means, which is preferably but not limited to a venturi injector, the water contacts oxygen stripping gas introduced into the injector means. Generally, the pump means, which may be one or a series of pumps, draws water from waterways surrounding the vessel into the transfer piping means. The oxygen stripping gas source on the vessel may be a standard source or method known in the art, such as a permeable membrane nitrogen generator, vessel flue gas, inert gas generator, or other. Control of the stripping gas delivery may be through a booster blower and/or a regulator connected in series with the stripping gas delivery means that is connected to the injector means. The stripping gas source is connected to both a receptacle or, optionally receptacles, which is preferably but optionally a ballast tank(s), and the injector means by stripping gas delivery means. Stripping gas may be delivered into and fill the receptacle, by a stripping gas delivery means. Another stripping gas delivery means allows stripping gas to flow through the injector means. This stripping gas delivery means may be connected to and deliver stripping gas from the receptacle or may be connected to and deliver stripping gas directly from the stripping gas source. When stripping gas is delivered to the injector means, which is preferably a venturi injector, the water pumping through the injector means contacts the stripping gas, and dissolved oxygen present in the water is transferred from the water to the micro-fine bubbles generated by the injector means. These micro-fine gas bubbles contain a mixture of stripping gas and oxygen that, along with the water, is pumped from the injector means into the receptacle. When the water is pumped into the receptacle, the stripping gas that may be present in the receptacle is exchanged preferably, but not exclusively, in a 1:1 volume ratio. This stripping gas may be re-directed to the injector means to provide for greater efficiency in the use of stripping gas.

Once inside the receptacle, the micro-fine bubbles float to the surface of the water in the receptacle whereupon the stripping gas-oxygen mixture is released within the receptacle's headspace or area above the water. The invention may also include a stripping gas delivery means that delivers stripping gas to the empty receptacle in order to prevent the reintroduction of oxygen to the deoxygenated water as the treated water enters the receptacle. The overall preferable but optional effect of this oxygen-stripping is to hinder the survival of aquatic organisms, such as but not limited to those commonly present in the ballast water, while also or alternatively providing corrosion inhibition.

The water treatment's start-up and shut down will coincide with the vessel's water intake. A re-circulation mechanism may be employed to further treat water and the need for such may be determined by a series of sensors, including but not limited to gaseous oxygen and dissolved oxygen sensors, present in the receptacles which record the dissolved oxygen concentration in the water so as to optionally verify disinfection. If a re-circulation mechanism needs to be activated, the shutdown operation, preferably although optionally, may be controlled by a control panel means that is connected to the sensors and valves.

In use, it can now be understood the system and method of water treatment may be used for a non-chemical, efficient treatment of water while serving as a corrosion inhibitor.

While a current embodiment of the system and method of water treatment has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable cylindrical conduit made of a wide variety of metals, plastic, or other sturdy material may be used for the transfer piping means and/or re-circulation piping means described. And, although the treatment of water using stripping gas induced deoxygenation having both aquatic species disinfection and corrosion inhibition properties, preferably but optionally on vessels, has been described, it should be appreciated that the system and method of water treatment herein described may also be suitable for a wide variety of water treatment applications including but not limited to wastewater management, agricultural applications, pool and spa applications, oil and gas applications, and various disinfectant applications. Additionally, a wide variety of holds or tanks of many shapes and sizes, as well as an open body of water, also may be used instead of the basic receptacle or ballast tank described. Furthermore, the method, configuration, size, shape and pressure and volume requirements may be adapted to conform to a wide variety of vessels of a variety of shapes and sizes, and a closed re-circulation system and method described may be transferable from one receptacle to another. The invention may also be adapted for use with a wide variety of pumps, receptacles, stripping gas generators or sources, pressure valves and other components that are required by the invention but already present in a vessel or other treatment location.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for water treatment comprising: an injector means having an inlet port adapted to receive water, an injector port adapted to receive oxygen stripping gas and an outlet port adapted to expel said water; a receptacle; wherein said water passes through said injector means thereby contacting said oxygen stripping gas being received through said injector port; wherein said water is expelled from said outlet port to said receptacle; and further comprising an oxygen stripping gas source, a first stripping gas delivery means, and a second stripping gas delivery means, wherein said first stripping gas delivery means connects said stripping gas source to said receptacle and said second stripping gas delivery means connects said receptacle to said injector port of said injector means.

2. A system for water treatment comprising: an injector means having an inlet port adapted to receive water, an injector port adapted to receive oxygen stripping gas and an outlet port adapted to expel said water; a receptacle; wherein said water passes through said injector means thereby contacting said oxygen stripping gas being received through said injector port; wherein said water is expelled from said outlet port to said receptacle; further comprising an oxygen stripping gas source, a first stripping gas delivery means, and a second stripping gas delivery means, wherein said first stripping gas delivery means connects said stripping gas source to said receptacle and said second stripping gas delivery means connects said receptacle to said injector port of said injector means; and further comprising a third oxygen stripping gas delivery means wherein said third stripping gas delivery means connects said stripping gas source to said injector port of said injector means.

3. A method for deoxygenating water comprising the following steps: utilizing an injector means having an inlet port adapted to receive water, an injector port adapted to receive oxygen stripping gas, and an outlet port adapted to expel said water; supplying into said inlet port said water to be treated; supplying oxygen stripping gas to said injector port, thereby providing said water with a myriad of micro-fine bubbles wherein oxygen in said water diffuses from an aqueous phase to a gaseous phase within said micro-fine bubbles; expelling said water and said micro-fine bubbles from said outlet port to a receptacle wherein said micro-fine bubbles are released from said water, thereby diffusing said oxygen from said water; and further comprising supplying oxygen stripping gas to said receptacle for the purpose of inhibiting corrosion in said receptacle.

4. A method for deoxygenating water comprising the following steps: utilizing an injector means having an inlet port adapted to receive water, an injector port adapted to receive oxygen stripping gas, and an outlet port adapted to expel said water; supplying into said inlet port said water to be treated; supplying oxygen stripping gas to said injector port, thereby providing said water with a myriad of micro-fine bubbles wherein oxygen in said water diffuses from an aqueous phase to a gaseous phase within said micro-fine bubbles; expelling said water and said micro-fine bubbles from said outlet port to a receptacle wherein said micro-fine bubbles are released from said water, thereby diffusing said oxygen from said water; and further comprising re-oxygenating said water before releasing said water from said receptacle into surrounding waterways.

* * * * *